T. F. TRUDEAU.
SAFETY DEVICE FOR GAGE GLASSES.
APPLICATION FILED APR. 16, 1917.
1,242,081.
Patented Oct. 2, 1917.
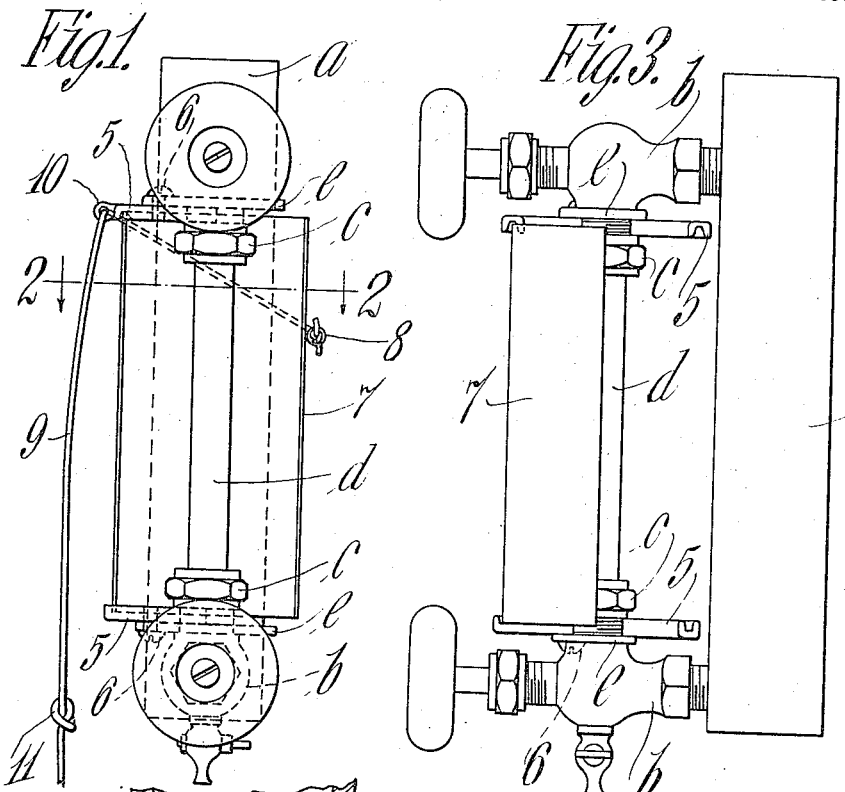
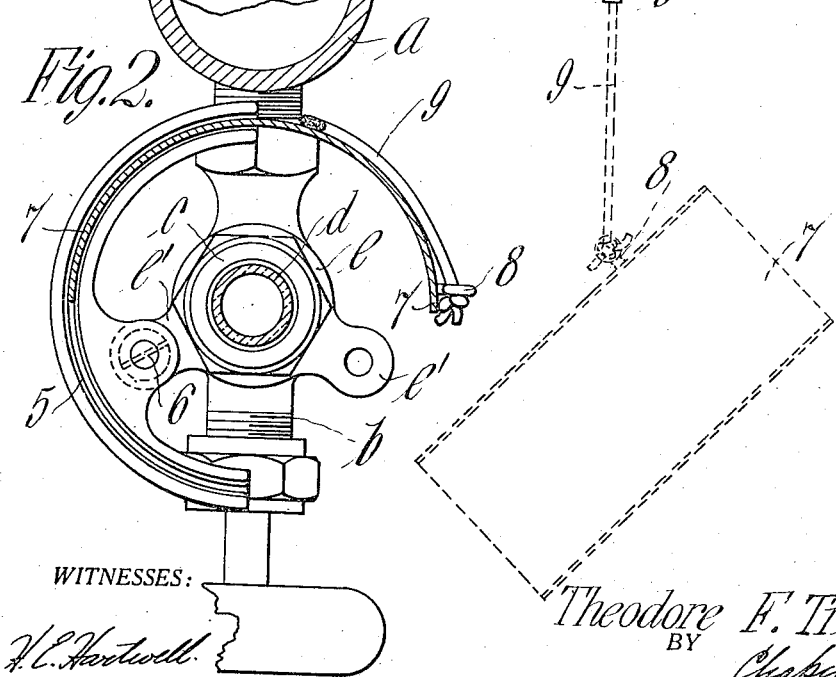
WITNESSES:
INVENTOR.
Theodore F. Trudeau.
BY
ATTORNEYS.

UNITED STATES PATENT OFFICE.

THEODORE FELIX TRUDEAU, OF WILLIMANSETT, MASSACHUSETTS, ASSIGNOR TO JOHN LEWIS PERKINS, OF HOLYOKE, MASSACHUSETTS.

SAFETY DEVICE FOR GAGE-GLASSES.

1,242,081.

Specification of Letters Patent.   Patented Oct. 2, 1917.

Application filed April 16, 1917. Serial No. 162,364.

*To all whom it may concern:*

Be it known that I, THEODORE FELIX TRUDEAU, a subject of the Dominion of Canada, residing at Willimansett, in the county of Hampden and State of Massachusetts, have invented certain new and useful Improvements in Safety Devices for Gage-Glasses, of which the following is a specification.

This invention relates to protecting devices for gage glasses.

An object of the invention is to provide in a device of the class described, a protecting shield adapted to be normally positioned in the rear of the gage glass to serve as a background therefor, and movable in an emergency to a position in front of the gage glass to serve as a shield for the gage cocks.

Another object of the invention is to provide in a device of the class described, a protecting shield arranged to swing circumferentially around the gage glass and adapted normally to be positioned in the rear thereof, and appropriate means to move the shield into a protecting position wherein the front peripheral portion of the gage glass is encompassed by the shield, whereby, in event the gage glass bursts, the escaping steam may be deflected from the gage glass cocks.

Another object of the invention is to provide a protecting device involving a movable shield, which may be attached to standard gage glasses without modification in the latter and which may be readily removed when desired, to permit convenient replacement of the gage glass.

Other objects and advantages will appear in the following description and will be pointed out in the appended claims.

The invention, in an embodiment at present preferred, is shown for illustrative purposes in the accompanying drawings, in which—

Figure 1 is a front elevational view of a gage glass showing the invention applied thereto;

Fig. 2 is a sectional plan view taken on the line 2—2 of Fig. 1; and

Fig. 3 is a side elevational view showing the shield in protecting position.

Referring to these drawings, in detail, reference $a$ indicates the water column of a boiler into which are threaded the usual upper and lower gage cocks $b$. Mounted between the latter and held by stuffing glands $c$ in the usual manner is the gage glass $d$. Mounted on each gage cock $b$ below its gland $c$ is a bracket $e$ which, as shown in Fig. 2, is provided with two perforated ears $e'$. These brackets $e$ are commonly provided, in the usual gage glass construction to support a pair of vertical rods, which are arranged parallel with the gage glass as a protecting means to prevent damage thereto. These protecting rods are not used with this invention, and the removal of the rods is the only change necessary in any standard gage construction in order that the invention may be applied.

The brackets $e$ heretofore described are employed as supporting means for the gage glass shield. Each plate $e$ supports a semicircular trackway 5 (Fig. 2) which is held to the plate in horizontal position by a screw 6. It is to be noted that the brackets $e$ do not have to be drilled to receive screw 6 for one of the holes therein, formerly used for the protecting rods, is employed as indicated in Fig. 2. The trackways 5 are preferably arranged in concentrical relation with the gage glass $d$ and extend through an arc of one hundred and eighty degrees on one side only of the gage glass $d$. As viewed in Fig. 2, the trackways 5 may be said to cover one upper and one lower quadrant. The adjacent faces of trackways 5 are grooved as indicated in Figs. 2 and 3 to receive a shield 7. The latter is preferably formed by bending a rectangular blank of sheet metal into semi-cylindrical form. Shield 7 is freely slidable in the trackways 5 and normally occupies the position shown in Figs. 1 and 2. When thus positioned, the shield occupies both upper quadrants as viewed in Fig. 2 and overlaps the trackway for an angle of ninety degrees.

Fixed to shield 7 is an eye 8 (Figs. 1 and 2) and secured thereto is a flexible cord 9 which extends around the back of the shield, as shown in Fig. 2, and passes through an eye 10 (Fig. 1) formed on the upper trackway. From eye 10, the cord 9 may be carried to any desired position for convenient operation. At a distance from eye 10, a knot 11 (Fig. 1) is formed in cord 9 for a reason to be described.

The operation of the device will now be described. The shield 7 is normally positioned, as shown in Figs. 1 and 2, so that it is at the back of glass *d*. In its normal position, the shield forms a background or reflector to permit the readings of gage glass *d* to be readily observed. The cord 9 extends to any convenient position, as desired by the fireman, usually downwardly as the water column *a* is ordinarily arranged at a considerable distance from the floor. When glass *d* bursts, there is ordinarily no danger of injury since no one is apt to be near the glass. The danger comes when the glass is to be replaced for the gage cocks *b* must first be closed to shut off the escaping water and steam. Ordinarily, the cocks *b* must be closed in the face of a cloud of escaping steam which is a dangerous operation. With the device described, however, there is no chance of injury to the fireman in closing the gage cocks. He simply pulls cord 9 as far as it will go which operation causes the shield 7 to move through an arc of one hundred and eighty degrees from the position shown in Fig. 1 to that shown in Fig. 3. The shield now lies in the two lower quadrants, as viewed in Fig. 2, and eyes 8 and 10 are positioned in vertical alinement. The cloud of escaping steam will thus be deflected by the shield so that cocks *b* may be closed off without difficulty. Having closed off cocks *b*, the broken glass *d* must then be replaced, and, to permit this operation to be conveniently performed, shield 7 is turned by hand through a further arc (ninety degrees in a counterclockwise direction as viewed in Fig. 2) until the shield is entirely removed from its guiding and supporting trackways. The shield is allowed to drop and the knot 11 in cord 9 comes into abutment with the eye 10 to limit the falling movement of the shield. The knot 11 is so located that the shield 7 assumes a position substantially as indicated by dotted lines in Fig. 3. With the shield thus removed, there is nothing to interfere with the operation of replacing glass *d*. Once the latter has been replaced, the shield 7 is also replaced and preferably in the guarding or protecting position shown in Fig. 3. The fireman may then safely open cocks *b* with the assurance that he will be protected by the shield in event the new glass immediately breaks. If the glass does not burst, the shield is moved to its original position ready for use in another emergency.

Thus, I have provided a protecting device for gage glasses which is characterized by structural simplicity and effectiveness in operation for protecting purposes. It is recognized that modifications may be made in the structure herein described without departing from the scope of the invention which is defined by the appended claims rather than by the foregoing description of a preferred form.

What I claim is—

1. A safety attachment for a gage glass device, comprising in combination supporting and guiding means adapted for attachment to said device, a shield mounted in said means and constructed to turn about the gage glass, said shield arranged normally in the rear of the latter, and means to turn the shield into a protecting position in front of the gage glass.

2. A safety attachment for a gage glass device, comprising, arcuate trackways adapted to be attached in spaced relation to said device, an arcuate shield supported in said trackways and adapted to slide circumferentially around the gage glass, said shield being normally disposed behind the gage glass as a background therefor, and means to move the shield into a protecting position in front of the gage glass.

3. A protecting attachment for a gage glass device, comprising substantially semi-circular trackways adapted to be secured in horizontal position and in vertically spaced relation to said device, a shield having a substantially semi-cylindrical surface and arranged to extend between said trackways, said shield being normally arranged to encompass the rear peripheral portion of the gage glass, and means to move the shield into a protecting position wherein the shield encompasses the front peripheral portion of the gage glass.

4. A protecting attachment for a gage glass device, comprising, upper and lower semi-circular tracks adapted to be secured to said device and constructed to extend from the rear to the front of the gage glass to surround a side peripheral portion thereof, a shield having a substantially semi-cylindrical surface and arranged to extend between said tracks, said shield being normally supported by a partial overlap with the tracks in a position to surround the rear peripheral portion of the gage glass, means to move the shield substantially half a revolution around the gage glass to a protecting position wherein the shield surrounds the front peripheral portion of the gage glass, said shield adapted to drop from said tracks when moved through a further angle, and means to support the disconnected shield at a distance below the gage glass device.

5. The combination with a gage glass and gage glass rod brackets, of trackways adapted for connection to the latter, a shield extending between the trackways and constructed to swing in an arcuate path around the gage glass, said shield being normally arranged to encompass the rear peripheral portion of the gage glass, means to move the shield into protecting position wherein the front peripheral portion of the gage glass is encompassed, said trackways constructed and arranged to permit disconnection of said shield on further movement from its protecting position.

6. A safety attachment for a gage glass device, comprising in combination, supporting and guiding means adapted for attachment to said device, a shield mounted in said means and constructed to turn about the gage glass, said shield arranged normally in the rear of the latter, and means operable at a distance to turn the shield into a protecting position, in front of the gage glass.

THEODORE FELIX TRUDEAU.

Copies of this patent may be obtained for five cents each, by addressing the "Commissioner of Patents, Washington, D. C."